United States Patent [19]

Konuma et al.

[11] Patent Number: 5,541,749
[45] Date of Patent: Jul. 30, 1996

[54] ELECTRO-OPTICAL DEVICE

[75] Inventors: Toshimitsu Konuma; Michio Shimuzu, both of Kanagawa; Akira Mase, Aichi; Takeshi Nishi, Kanagawa; Shunpei Yamazaki, Tokyo, all of Japan

[73] Assignee: Semiconductor Energy Laboratory Co., Ltd., Kanagawa-ken, Japan

[21] Appl. No.: 228,277

[22] Filed: Apr. 15, 1994

Related U.S. Application Data

[63] Continuation-in-part of Ser. No. 910,547, Jul. 8, 1992, abandoned.

[30]  Foreign Application Priority Data

Jul. 9, 1991 [JP] Japan .................. 3-195870
Sep. 10, 1991 [JP] Japan .................. 3-258475

[51] Int. Cl.⁶ .................. G02F 1/1335; G02F 1/13
[52] U.S. Cl. .................. 359/68; 359/51
[58] Field of Search .................. 359/54, 66, 68, 359/51, 74, 79

[56] References Cited

U.S. PATENT DOCUMENTS

| | | | |
|---|---|---|---|
| 4,800,375 | 1/1989 | Silverstein et al. | 359/68 |
| 4,944,576 | 7/1990 | Lacker et al. | 359/51 |
| 4,946,259 | 8/1990 | Matino et al. | 359/68 |
| 5,018,840 | 5/1991 | Ogawa | 359/51 |
| 5,059,000 | 10/1991 | Kaneko et al. | 359/68 |

FOREIGN PATENT DOCUMENTS

| | | | |
|---|---|---|---|
| 0263122 | 5/1985 | Japan | 359/68 |
| 0116620 | 4/1989 | Japan | 359/68 |

*Primary Examiner*—William L. Sikes
*Assistant Examiner*—Huy Mai
*Attorney, Agent, or Firm*—Sixbey, Friedman, Leedom & Ferguson, P.C.; Gerald J. Ferguson, Jr.

[57] ABSTRACT

A reflective-type liquid crystal device including a first substrate; a plurality of color layers formed on the substrate and arranged in the form of a matrix; a first electrode arrangement formed on the substrate; a light modulating layer including a dispersion-type liquid crystal adjacent the first electrode arrangement; a second electrode arrangement opposite to the first electrode arrangement with the light modulating layer therebetween; and a plurality of thin film transistors for switching the light modulating layer.

4 Claims, 3 Drawing Sheets

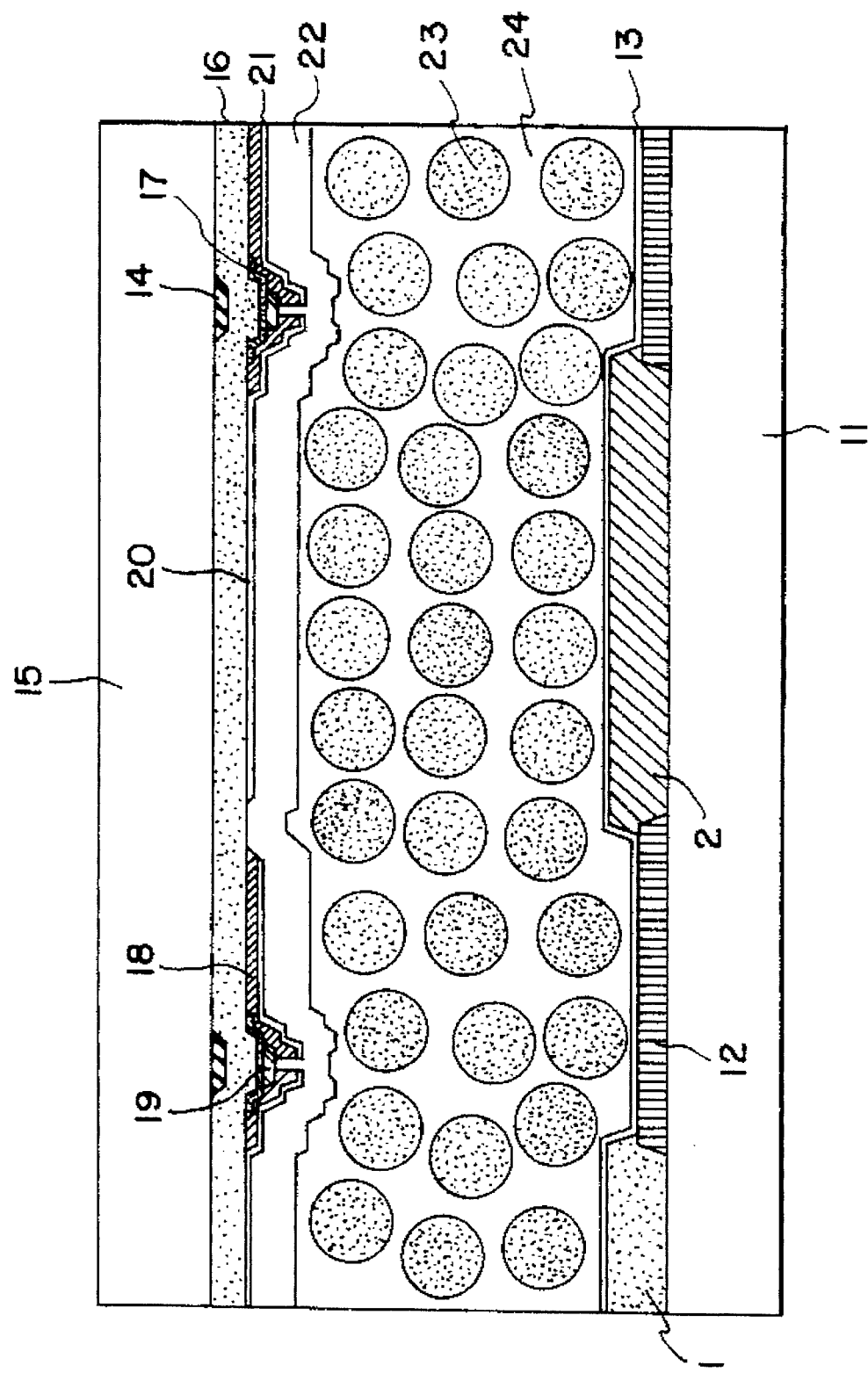

5,541,749

ELECTRO-OPTICAL DEVICE

RELATED APPLICATION

This application is a continuation-in-part of Ser. No. 07/910,547 filed Jul. 8, 1992 now abandoned.

BACKGROUND OF THE INVENTION

1. Field of the Invention

The present invention relates to a dispersion-type liquid crystal electro-optical device comprising a liquid crystal/resin composite comprising a high polymer resin having dispersed therein a liquid crystal material. More particularly, the present invention relates to a reflection-type liquid crystal electro-optical device having high light transmittance and capable of providing images with clear black.

2. Description of Prior Art

Liquid crystal electro-optical devices well known and already put to practice heretofore are those operating in TN (twisted nematic) mode or STN (super twisted nematic) mode, in which nematic liquid crystal compositions are used. Recently, liquid crystal electro-optical devices taking advantage of ferroelectric liquid crystals are also realized. The liquid crystal electro-optical devices above basically comprise a first and a second substrate each having provided thereon an electrode and a lead, and a liquid crystal composition having incorporated therebetween. Thus, the liquid crystal composition can undergo a transition between states by applying thereto an electric field through the electrodes provided on the substrates. These changes in states are ascribed to the anisotropy of the dielectric constant of the liquid crystal composition itself in the case of nematic liquid crystals, etc., and to the spontaneous polarization in the case of ferroelectric liquid crystals. In this manner the electro-optical effect due to the changes in state of the liquid crystal molecules can be utilized to give an electro-optical device.

In the TN mode or the STN mode liquid crystal electro-optical devices, the liquid crystal molecules within the plane of the liquid crystal layer in contact with the substrate arrange themselves along the rubbing direction upon applying a rubbing treatment to establish a molecular orientation. The upper and the lower substrates are displaced from each other in such a manner that the rubbing direction of one substrate make an angle in the range of from 90° C. or from 200° to 290° C. to that of the other. Thus, at the central portion of the liquid crystal layer, the liquid crystal molecules are arranged in a spiral to minimize the energy between the upper and the lower liquid crystals which are positioned with respect to each other within an angle in the range of from 90° to 290° C. Furthermore, in such a construction, the liquid crystal material in an STN mode device may be a mixture with chiral substances if necessary.

For the known electro-optical devices above, however, it is requisite to incorporate polarizer sheets and also to maintain the liquid crystal molecules in a regularly oriented manner within the liquid crystal electro-optical device. The treatment for establishing a molecular orientation comprises rubbing the orientation film (which is an organic film in general) with a cotton cloth or a velvet cloth. If no such treatment is applied, the electro-optical effect of the liquid crystals cannot be expected because no uni-direction oriented liquid crystal molecules would be realized. Accordingly, the device inevitably comprises a pair of substrates to define a space to maintain therein the liquid crystal material. Thus, the liquid crystal is injected into said space and then subjected to orientation treatment to realize an optical effect.

In contrast to the liquid crystal electro-optical device above, there is also known a dispersion-type liquid crystal which can be employed free of such polarizers and robbing treatment, and which yet provides an image plane having a brighter contrast. The light control layer of this dispersion-type liquid crystal comprises a light-transmitting solid polymer maintaining therein the liquid crystal material in granules or in a sponge-like structure. The liquid crystal device can be fabricated by dispersing encapsulated liquid crystal material into a polymer, and then providing said polymer on a substrate as a film or a thin film. The liquid crystal can be encapsulated with gum arabic, poly (vinyl alcohol), gelatin, and the like.

In a dispersion-type liquid crystal comprising liquid crystal molecules encapsulated with poly(vinyl alcohol) and having a positive dielectric anisotropy, for example, the liquid crystal molecules arrange themselves in such a manner that the major axes thereof become parallel to the direction of the electric field. If the refractive index of the solid polymer is equivalent to that of the arranged liquid crystal upon application of the electric field, the light control layer turns transparent. When the electric field is turned off, the liquid crystal molecules take a random arrangement and hence the refractive index thereof greatly deviates from that of the solid polymer. Thus an opaque state is realized, because the light is scattered by the liquid crystal molecules and the light transmittance becomes low. The device takes advantage of the difference between the transparent state and the opaque state to provide information of various types.

In addition to the encapsulated type, dispersion-type liquid crystals include those comprising liquid crystal materials being dispersed in an epoxy resin; those taking advantage of phase separation between the liquid crystal and the resin, which is realized by irradiating a beam onto a mixture of a liquid crystal and a photo-curable resin to cure the resin; and those comprising a three-dimensionally bonded polymer impregnated with a liquid crystal. In the present invention, the term "dispersion-type liquid crystal" encompasses all the types enumerated above.

The dispersion-type liquid crystal electro-optical devices above are freed from polarizer sheets and hence have extremely higher light transmittance as compared with those of the conventional electro-optical devices operating in a TN mode, STN mode, etc. More specifically, the transmittance per single polarizer sheet is about 50%. Hence, in an active matrix type electro-optical device using a combination of said polarizer sheets result in a final transmittance of about 1%; in an electro-optical device operating in an STN mode, the actual transmittance is about 20%. Accordingly, much effort in those conventional electro-optical devices is placed to realize a bright display by increasing illuminance of the back-lighting. The dispersion-type liquid crystal electro-optical devices transmit, in contrast to the conventional electro-optical devices, 50% or more of the incident light. This is a unique superiority of the dispersion-type liquid crystal electro-optical devices which results from their structure free of any polarizer sheets.

As mentioned earlier, a dispersion-type liquid crystal takes a transparent state and an opaque state, and because it is capable of transmitting a large amount of light, research and development efforts are generally concerned in realizing a transmitting type device. Particularly among them, projection-type liquid crystal devices are the most actively developed types. A projection-type liquid crystal electro-optical device comprises a liquid crystal electro-optical device panel placed in the light path to intervene the light beam emitted from the light source, so that the light having passed through this panel may be projected on a wall plane through a slit provided at a predetermined angle. The liquid crystal molecules in this panel are in a random arrangement at a low level electric field below the threshold value in which the liquid crystal molecules do not respond, and hence provides a white opaque state. The light incident to the panel at this instance is scattered upon passing through the panel to largely extend the light path thereof. Accordingly, the scattered light is mostly cut off by the slit provided subsequent to the panel. A black state realizes on the wall by thus cutting off the scattered light. When an electric field is applied at an intensity over the threshold value, on the other hand, the liquid crystal molecules arrange themselves in response to the electric field to make a parallel arrangement with respect to the direction of the electric field. Thus, the light incident thereto advances straight without being scattered to finally realize a bright state with high luminance on the wall.

Three dispersion-type panels each equipped with corresponding one of red, green, and blue color filters are established to obtain a synthesized image from red-colored image, green-colored image, and blue-colored image. When the three colors are transmitted and superposed on the wall, the image obtained as a result is a white and bright image. On the contrary, if the three colors are in a scattered state, the resulting image expressed on the wall is a black one.

As mentioned in the foregoing, a black and a light-transmitting state can be obtained with a dispersion-type liquid crystal electro-optical device operating in a projection mode. The use of a slit at a predetermined angle to realize black images, however, disadvantageously reduces the amount of transmitted light. Thus, the liquid crystal electro-optical device thus obtained could only provide a slightly lighter image even in a direct view type one.

A dispersion-type liquid crystal electro-optical device can be also operated in a reflection mode. However, the reflection mode electro-optical device realizes a white state but no black state.

SUMMARY OF THE INVENTION

The present invention relates to a liquid crystal electro-optical device operating in a reflection mode (referred to hereinafter as "reflection-type liquid crystal electro-optical device"). As described above, a dispersion-type liquid crystal electro-optical device can take two states, i.e., a scattered state which results as a state having no electric field applied thereto, and a light-transmitting state which is realized upon application of an electric field. Particularly, the present invention displays white by the opaque state corresponding to the scattered state of the liquid crystal molecules, and black or an analogous color with a layer of a specific color provided subsequent to the dispersion-type liquid crystal layer, provided that the liquid crystal layer comprises liquid crystal molecules oriented along one particular direction to realize a light-transmitting state.

The present invention also provides a colored image by establishing, in addition to the black layer, color layers of red, green and blue, or cyan, magenta and yellow on the dispersion-type liquid crystal layer (electro-optical modulating layer) opposite to the side to which the light is incident. However, a clear black cannot be expressed by a simple color mixing of those three colors red, green and blue, or cyan, magenta and yellow. Accordingly, to realize a panel which operates in a reflection mode, an additional black dye layer (BL) 4 is provided to express black color in addition to the dye layers cyan (C) 1, magenta (M) 2, and yellow (Y) 3, as shown schematically in the cross sectional view of a liquid crystal electro-optical device according to the present invention in FIG. 2. Selection is made from a combination of red, green and blue dye layers and a combination of cyan, yellow and magenta dye layers depending on a color tone to be expressed by an electro-optical device. Cyan, yellow and magenta can be expressed by using two colors of red, green and blue. Red, green and blue can be expressed by using two colors of cyan, yellow and magenta.

The liquid crystal electro-optical device according to the present invention is characterized by that it operates in a reflection mode. It is also characterized by that, in case it comprises two substrates, the dye layer is provided to the first substrate side and not to the second substrate side to which the light is incident; in case it comprises only one substrate, the dye layer is provided subsequent to the dispersion-type liquid crystal layer so that the light may be incident first to the liquid crystal layer.

By taking such a construction, the present invention expresses white by scattering the incident light with randomly oriented liquid crystal molecules under a state applying no electric field, and black or colors by regularly arranging the liquid crystal molecules by applying electric field thereto and thereby passing the reflected light through a black layer, or mixing color of the reflected light having passed through each of the dye layers of red, green and blue, or cyan, magenta and yellow. In this construction, black can be expressed either incompletely by color mixing, or clearly by making use of the black color dye layer.

Various colors can be expressed by mixing colors, that is, by selectively switching on and off pixels of the dye layers.

Furthermore, because a black dye layer is established, white and colors other than black and white can be expressed by using other types of dye layers, provided that said dyes are usable to subtractive color mixing.

The liquid crystal electro-optical device having the construction described above can be fabricated by, for example, a process which comprises fabricating a first substrate by establishing color dye layers described above on a substrate, then forming a protective layer 5 on the dye layers for the purpose of protecting the dye layers, preventing diffusion of the impurities, and leveling the dye layers to give a uniform height, and providing a first transparent electrode followed by patterning; fabricating a second substrate having established thereon a second transparent electrode 6; and sandwiching a dispersion-type liquid crystal material 7 between the first and the second substrates to obtain a panel. The dye layer may be formed on a transparent conductive film. However, since the electric field is then applied to both color dye layer and the liquid crystal layer by taking such a structure, it is necessary to modify the construction by, for example, changing the liquid crystal material to a more pertinent one. This is because there occurs fluctuation in the threshold value for driving the liquid crystal or an influence on the frequency characteristics.

The second layer may comprise a transparent conductive film as above, or an M-I-M (metal-insulator-metal) type non-linear element consisting of layered structure of a metal film, an insulator film, and a metal layer, or a thin film transistor. In general, a dispersion-type liquid crystal does not have a sharp rise in the transmittance upon application of an electric field, and hence is not suitable for direct matrix drive using multiple electrodes. Thus, it is desired to take advantage of non-linear elements or think film transistors as supports in driving the liquid crystal. By taking such measures, a steep rise of transmittance can be realized. In other words, each of the pixels can be controlled to give a scattering state and a light transmitting state while matrix-driving the liquid crystal.

In providing a colored image, it is preferred that the dye layers are arranged, e.g., in the order of red, green, blue and black, or cyan, yellow, magenta and black as shown in FIG. 1, so that each of the colors may be placed farthest from the same color. In providing a dye layer on a first substrate, for example, cyan, yellow, magenta and black are arranged in this order from the Mth column to the (M+3)th column in the Nth row, and then magenta, black, cyan and yellow are arranged in this order in the subsequent (N+1)th row from the Mth column to the (M+3) column. Alternatively, red, green, blue and black are arranged in this order from the Mth column to the (M+3)th column in the Nth row, and then, blue, black, red and green are arranged in this order in the subsequent (N+1)th row from the Mth column to the (M +3th) column. It can be seen that the dye layer arrangement is shifted by two columns in the adjacent dye layer rows. In this manner, each of the colors is placed most distantly from another same color, and the four colors each appear at an equal probability at any position.

The panel thus fabricated can be used in a reflection-type liquid crystal electro-optical device by direct view from the dispersion-type liquid crystal side with respect to the color dye layer. Thus, white can be recognized as a state in which no electric field is applied, and in which light is scattered. When an electric field is applied, on the other hand, the color dye layer under the liquid crystal layer (electro-optical modulating layer) can be perceived because the liquid crystal molecules turn into a light-transmitting state. The colors red, green, blue and black, or cyan, magenta, yellow and black can be observed by selecting them as the color dye layers. Actually, combinations of those colors are available to provide mixed colors and gradation. Since colors can be obtained in addition to white, the resulting color image is formed as if it were drawn on a sheet of white paper. Thus, one receives an impression as if watching a printed image from this panel, which is in contrast to that one receives from a conventional dark and bright liquid crystal panel.

In view of the fact that the conventional stationaries are based on white color, the liquid crystal panel according to the present invention matches nicely with them. Furthermore, the liquid crystal electro-optical device is more favorable for the eyesight because it does not emit any light, and hence causes less fatigue of human eyes.

In addition to the application of the present invention to color panels of the reflective type, simple black-and-white display panels can be obtained by providing a dye layer composed of a black dye alone. To make it simpler, the white and the black can be expressed by realizing a scattering state and a transmitting state by providing a black color dye layer in the outer side of the first light-transmitting substrate, on the side opposite to the one on which the cell is formed. If a blue-and-white mode is preferred, a blue color dye layer may be established on the outer side of the substrate instead of the black color dye layer. The blue color may also be replaced by any of colors which provide a clearly distinguishable images on a white when a character, a pattern, a symbol, etc., are expressed. Examples of such colors include dark blue, dark green, and dark brown. A reflection-type two-colored liquid crystal electro-optical device can be thus realized.

Furthermore, in this case, it is not necessary to provide the particular color dye layer in correspondence to the specified pixels. That is, the dye is provided to the whole substrate. Otherwise, a substrate colored in advance to a specific color may be used instead of establishing a particular dye layer on the substrate.

The color dye layers applicable to the present invention include those composed of pigments, dyes, paints, and inks used for color printing. In addition to the coloring materials above, also inclusive are aluminum powder having colored to a specific color by a surface treatment such as oxidizing into alumina, carbon powder, and graphite film.

The present invention provides, by taking the construction described in the foregoing, a dispersion-type liquid crystal electro-optical device operating in a reflection mode and yet capable of expressing black color clearly.

Accordingly, the liquid crystal electro-optical device according to the present invention provides, both in a two-colored display such as a black-and-white display and in a color display using more dye layers in addition to black and white, a more clear and high contrast information.

The present invention also provides a color liquid crystal panel operating in reflection mode free of polarizer sheets. Thus, the resulting panel is bright and has less loss of light. The panel has a milky white background that it provides to one who watches it an impression as if watching a printed sheet of paper.

Still advantageously, the liquid crystal electro-optical device according to the present invention can be realized without being equipped with a backlighting. Thus, a thinner and lighter liquid crystal electro-optical device with low power consumption is provided.

BRIEF DESCRIPTION OF THE DRAWINGS

FIG. 4 shows a schematic view of another liquid crystal device in accordance with the invention.

DETAILED DESCRIPTION OF THE INVENTION

The present invention is described in further detail below referring to some examples, but it should be understood that the present invention is not to be limited thereto.

EXAMPLE 1

Figure 1:
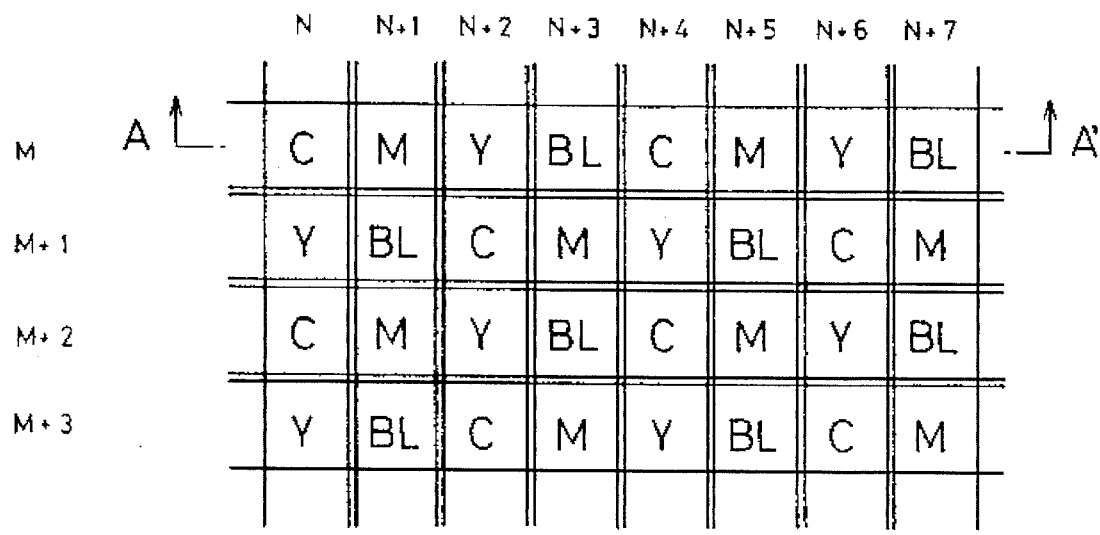
FIG. 1 shows a schematic view from the upper side of a liquid crystal electro-optical device according to the present invention.
Figure 2:
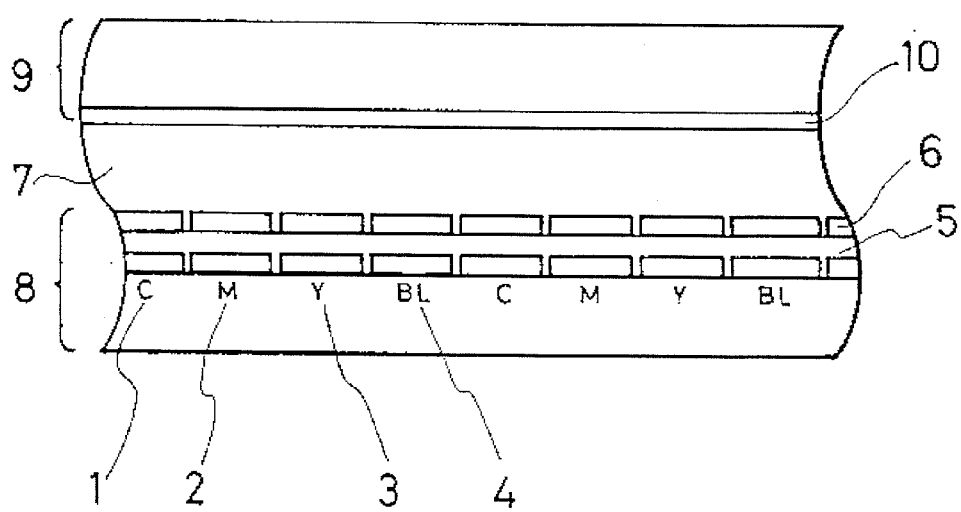
FIG. 2 shows a schematic cross sectional view of a liquid crystal electro-optical device according to the present invention.

Referring to FIG. 1, the fabrication of the liquid crystal electro-optical device according to the present invention is described. The color dye layers, i.e., cyan 1, magenta 2, yellow 3, and black 4 color dye layers, were formed by offset printing and arranged on the first substrate, each at the corresponding pixels. After forming a 1 to 5 μm thick leveling layer for the purpose of controlling the dye layers to a uniform height and to protect the surface of the dye layers, a 500 to 2,000 Å thick transparent conductive film 6 made of an oxide of tin and indium, i.e., an ITO (indiumtin-oxide) film, was deposited thereon by a known sputtering or vapor deposition process. The sheet resistivity obtained on the resulting film was in the range of from 20 to 200 $\Omega/cm^2$. The film was then patterned by applying a conventional photolithographic technology to obtain a first substrate 8. Then, a polysilicon TFT was formed by a known process. The first substrate and a second substrate 9 provided with a second transparent electrode 10 thereon were laminated incorporated therebetween a liquid crystal layer (electro-optical modulating layer) 7 with a spacer, at a distance of from 5 to 50 µm, preferably from 7 to 20 µm.

A cyanobiphenyl nematic liquid crystal having a refractive index of 1.582 and a Δn of 0.240 was used together with a mixed system of a urethane-based oligomer and an acrylic monomer, having a refractive index of 1.573, as an unsolidified photocurable resin.

The liquid crystal material above was injected into a liquid crystal cell defined by the first and the second substrates above at a temperature higher than the N-I phase transition point of the liquid crystal mixed system, and a UV beam was irradiated thereto at an intensity of frown about 10 to 100 mW/cm² for about 30 to 300 seconds to thereby cure the resin while allowing the resin and the liquid crystal to undergo phase separation. Thus was obtained a color dispersion-type liquid crystal display device.

Figure 3:
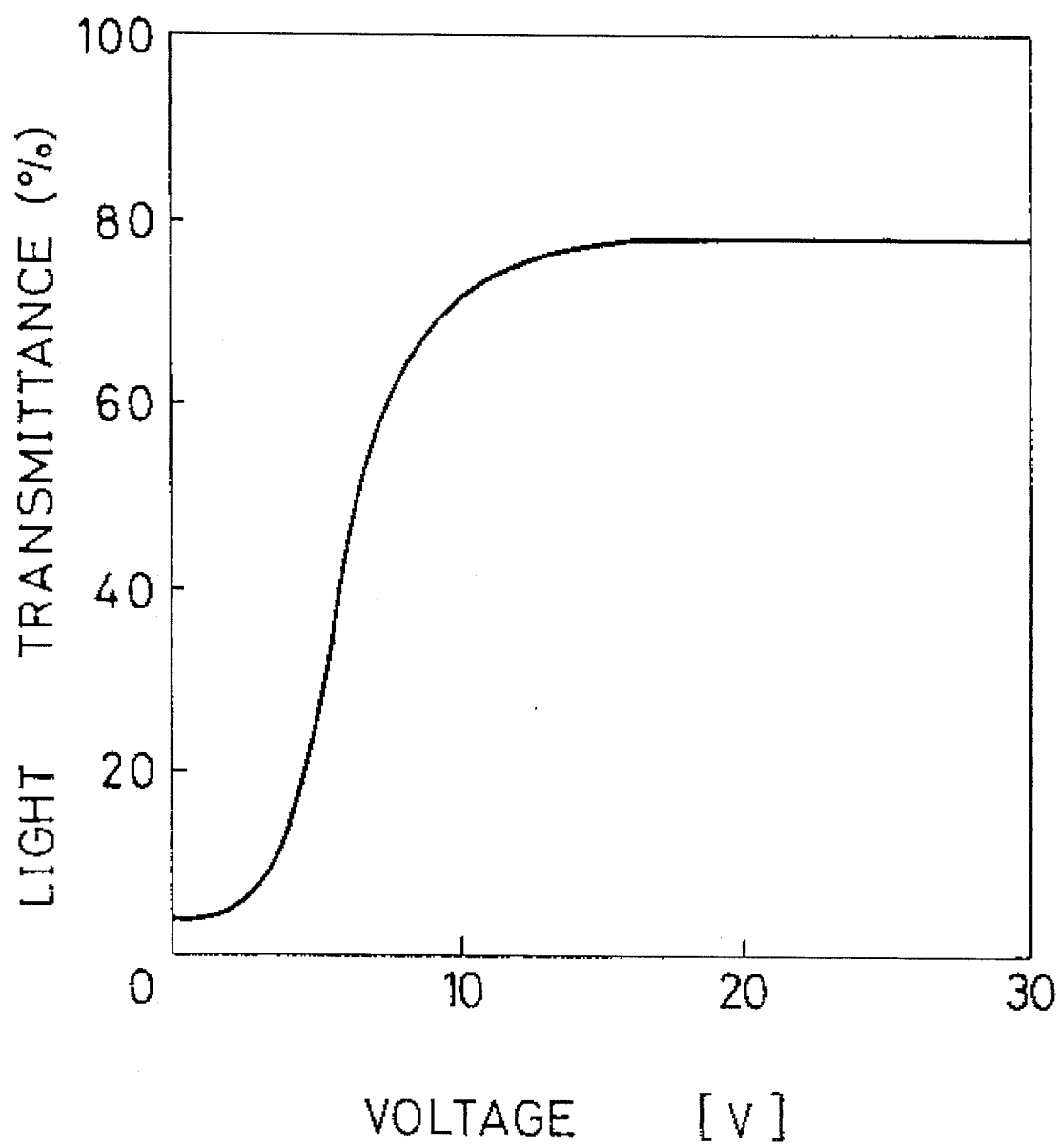
FIG. 3 is a graph showing an example of optical characteristics of an embodiment according to the liquid crystal electro-optical device of the present invention.

The color dispersion-type liquid crystal display device turns white opaque and the dye layer provided on the first substrate cannot be observed when no electric field is applied thereto because the liquid crystal molecules are in a scattered state. The degree of scattering was controlled by adjusting the voltage applied to the liquid crystal. This voltage control was conducted by applying an AC voltage between the electrodes, and thereby changing the voltage between the source and the drain of the TFT. The relation between the voltage applied to the liquid crystal and the light transmittance of the dispersion-type liquid crystal layer is given in FIG. 3. At a voltage below the threshold value of 3.4 V, the transmittance was in the range of from 0.1 to 5%. On applying a voltage of 15 V, a maximum transmittance of 75 to 85% was achieved. Furthermore, a gradation in 16 steps was realized by changing the applied voltage. The "transmittance" as referred herein is defined as a luminance of a liquid crystal panel fabricated in the same process as that of the liquid crystal electro-optical device of the present example except for omitting the dye layer, said luminance having measured on a projection plane by using said panel in a projection mode. A transmittance of 100% is defined as a luminance measured on the projection plane without incorporating any liquid crystal panels in the light path between the light source and the projection plane.

As a result, a stepwise change of each of the dye layers on the first substrate was observed, and clear images of each of the dye layers were ascertained at a completely transparent state. Furthermore, by switching each pixels and also by controlling the applied voltage, a 320×200-pixel color dispersion-type liquid crystal display device based on subtractive color mixing was realized.

EXAMPLE 2

A substrate having provided thereon dye layers of cyan, magenta, yellow, and black in correspondence to the pixels as shown in FIG. 1 was obtained by a similar process as that used in EXAMPLE 1. To the resulting substrate was provided a 1 to 5 µm thick leveling layer to control the height of the dye layers to a uniform level, and an ITO film was provided further thereon by patterning. Thus was obtained the first substrate. A scattered liquid crystal layer was formed on the resulting substrate by casting, using a cyanobiphenyl based nematic liquid crystal having a refractive index of 1.582 and a Δn of 0.240 and poly(vinyl alcohol) as the encapsulating material. Thus was the liquid crystal layer obtained by hot drying the solvent at a dry thickness of from 5 to 50 µm, preferably from 7 to 20 µm. After forming TFTs on a second substrate, the first substrate obtained above was superposed on the second substrate and tightly adhered by vacuum lamination to obtain a fixed liquid crystal cell.

The color dispersion-type liquid crystal display device thus obtained turns white opaque and the dye layer provided on the first substrate cannot be observed when no electric field is applied thereto, because the liquid crystal molecules are in a scattered state. The transmittance at this state is preferably in the range of from 0.1 to 1%, and was found in the range of from 0.1 to 5%. The degree of scattering was controlled by adjusting the AC voltage applied between the electrodes. Each of the dye layers provided on the first substrate gradually became perceivable with changing the applied voltage, until each of the dye layers happened to be observed clearly. Furthermore, by switching each pixels and also by controlling the applied voltage, a color dispersion-type liquid crystal display device based on subtractive color mixing was realized. Two substrates were used in the foregoing EXAMPLES 1 and 2, however, the present invention is not only limited to this structure, and only one substrate may be used. In such a case, a dye layer, a first electrode, a dispersion-type liquid crystal layer (electro-optical modulating layer), and a second electrode are provided on a single substrate to provide the same effect as in the electro-optical devices according to the present invention as described above.

EXAMPLE 3

A process for fabricating a two-color liquid crystal electro-optical device is described. A first substrate was fabricated by coating the whole surface of a first substrate with a black printing ink using a roll coater and drying, followed by coating with a transparent PVA [poly(vinyl alcohol)] resin at a thickness of from 2 to 3 µm to provide a protective layer. An ITO film was then provided on the resulting substrate by a known process and patterned to complete a first substrate. Then, cyanobiphenyl based nematic liquid crystal (10 cc) was mixed in a 20% chloroform solution of the modified acrylate based resin and stirred for one minute to disperse the cyanobiphenyl based nematic liquid crystal in the solution and applied to the glass substrate having provided thereon an ITO film at a uniform thickness by using spin coater (4,000 rpm). Thus was obtained a uniform liquid crystal high polymer dispersion film at a thickness of 11.0±0.3 µm in average.

A 100 nm thick ITO film was deposited on the resulting high polymer film by RF sputtering. Then, the ITO film was coated with a 15% chloroform solution of modified acrylate based resin at a uniform thickness using a spin-coater (2000 rpm). To obtain a protective film, this step was repeated 5 times to obtain a 2.5 mm thick high polymer film.

The liquid crystal electro-optical device thus obtained was subjected to a measurement of optical properties. A light emitted by applying a DC voltage of 12 V to a halogen lamp having a nominal 12 V–100 W was irradiated to the substrate in such a manner that the incident light make a right angle with the substrate, while measuring the luminance of said substrate with a luminance meter established at a position making an angle of 30° with respect to the direction vertical to the substrate and at a distance of 1 m frown the substrate. In applying rectangular waves of 30 V and 37.5 Hz to the substrate, a reflectance of about 65% and about 5% were obtained without applying any electric field and at applying an electric field, respectively, provided that the luminance of a direct light is taken as 100%. Furthermore, the black color of the underlying dye layer was clearly distinguished. Similarly, direct beam at a state free of electric field was completely scattered to express white color.

EXAMPLE 4

An aluminum substrate was subjected to surface treatment to obtain a black alumite layer on the surface. In this manner, a black dye layer having an insulating surface was established on the substrate. By patterning ITO films on the desired portions of the insulating surface, a substrate was obtained to form thereon a dispersion-type liquid crystal layer. A dispersion of a mixed liquid crystal was prepared by mixing 0.35 g of the mixed liquid crystal composed of a 73:27 mixture by weight of a cyanobiphenyl liquid crystal and a cyanophenyl ester liquid crystal with 10 ml of a 20% chloroform solution of an urethane resin, and then stirring the resulting mixture for one minute. The liquid crystal dispersion thus obtained was applied to the substrate fabricated above at a uniform thickness by using a spin coater (4,500 rpm).

Thus was obtained a uniform liquid crystal high polymer dispersion film having a thickness of 10.5±0.2 μm in average.

A 150 nm thick ITO film was deposited on the resulting high polymer film. Then, the ITO film was further coated with a 15% chloroform solution of modified acrylate based resin at a uniform thickness using a spin-coater (2000 rpm). To obtain a protective film, this step was repeated 5 times to obtain a 2.5 mm thick modified acrylate high polymer film.

The liquid crystal electro-optical device thus obtained was subjected to a measurement of optical properties as in EXAMPLE 3. In applying rectangular waves of 30 V and 37.5 Hz to the substrate, a reflectance of about 60% and about 5% were obtained without applying any electric field and at applying an electric field, respectively, provided that the luminance of a direct light is taken as 100%.

In EXAMPLES 3 and 4 above, only one substrate was used. However, the liquid crystal electro-optical device according to the present invention is not only limited to such constructions and two substrates may be used as well. It is requisite, however, that at least a light-transmitting second substrate is used.

Another example of a liquid crystal device in accordance with the present invention is described below in conjunction with FIG. 4. The same reference numerals as used in the prior figures are used for similar elements.

A first substrate, 11 is made of, for example, aluminum or glass having a metal coating thereon to provide a reflective mode. On substrate 11, color dye layers 1, 2 . . . of different colors such as cyan, magenta, yellow and black are formed in the same manner as in EXAMPLE 1. The color dye layers are arranged on the substrate in the form of a matrix to define pixels. Preferably, a black-matrix 12 made of, for example, chromium, is formed between adjacent color dye layers. Then, a continuous transparent conductive layer 13 such as ITO is formed over the first substrate.

On the other hand, a gate electrode 14 and its wiring made of doped polysilicon, for example, is formed on a second substrate 15 made of glass in correspondence with each of the color layers. A silicon oxide layer 16 as a gate insulating layer is formed on the gate electrode 14 by CVD using a TEOS and an oxygen gas, for example. Then, an amorphous silicon layer 17 as a channel layer and a micro-crystalline silicon layer 18 as source and drain regions are laminated on the gate insulating layer 16. Preferably, an etching stopper 19 made of silicon oxide is formed between the amorphous silicon layer 17 and the micro-crystalline silicon layer 18 in order to avoid a damage to the channel layer when patterning the micro-crystalline layer 18. Thus, thin film transistors are formed on the second substrate.

Then, each TFT is provided with a pixel electrode 20 and a source wiring 21 made of ITO and a protective film 22 such as polyamide is provided on the entire surface of the second substrate.

The above manufactured first and second substrates are mated with each other so that each TFT is located in the vicinity of a corner of the corresponding color layer, specifically, each TFT overlaps the black-matrix, rather than the color layer.

Between the first and second substrates, an uncured resin in which a number of droplets 23 of liquid crystals is introduced and then cured in the same manner as in EXAMPLE 1. Thus, a light modulating layer having droplets of liquid crystals 23 dispersed in a resin 24 is formed.

An active matrix color display utilizing a polymer dispersion-type liquid crystal (PDLC) is thus obtained in the FIG. 4 embodiment, such a display having been previously discussed hereinbefore. In the case of producing a color display device having a plurality of pixels using a polymer dispersion-type liquid crystal, because the threshold voltage of a polymer dispersion-type liquid crystal is generally not so well defined as compared with TN liquid crystal, it is more advantageous to use TFTs for driving the liquid crystal device, especially when the number of pixels is increased. Moreover, because the transmissivity of PDLC itself is very high (for example 70%), even if TFTs are used and the aperture ratio decreases to, for example, 50%, the total transmissivity of the entire cell is 70% ×50% =35%, which value is tolerable for use in a reflection mode in which no special light source is used. However, in the case of TN or STN liquid crystal devices, the transmissivity of the liquid crystal is very low, for example, 30% because of the use of polarizing plates. Therefore, if TFTs are used to drive such a display, the total transmissivity is 30% ×50% =15%. Thus, if this device were used in the reflection mode, the display would be too dark.

Therefore, it is emphasized that only the PDLC with TFTs can exhibit good visibility as a color display even if used in a light reflection mode.

While the invention has been described in detail and with reference to specific embodiments thereof, it will be apparent to one skilled in the art that various changes and modifications can be made therein without departing from the spirit and scope thereof.

What is claimed is:

1. A color liquid crystal device comprising:
   a first transparent substrate having a first transparent electrode arrangement;
   a second substrate opposed to said first substrate;
   a plurality of color layers of black, cyan, yellow and magenta formed on said second substrate and arranged in the form of a matrix;

a second electrode arrangement formed on said color layers and comprising a plurality of transparent conductive layers arranged in a matrix form corresponding to said plurality of color layers;

a light modulating layer comprising a dispersion-type liquid crystal interposed between said first and second substrates; and a plurality of thin film transistors for switching said liquid crystal through said second electrode arrangement, wherein a color image formed from said color layers is seen by a viewer from the side of said first substrate.

2. A reflective-type liquid crystal device comprising:

a first substrate;

a plurality of color layers black, yellow, cyan, and magenta formed on said substrate and arranged m the form of a matrix;

a first electrode arrangement formed on said substrate;

a light modulating layer comprising a dispersion-type liquid crystal adjacent to said first electrode arrangement:

a second electrode arrangement opposite to said first electrode arrangement with said light modulating layer therebetween; and a plurality of thin film transistors for switching said light modulating layer.

3. The liquid crystal device of claim 2 wherein said plurality of color layers include at least a black color layer.

4. The liquid crystal device of claim 3 further comprising a second substrate opposite to said first substrate with said light modulating layer therebetween.

* * * * *